US012746561B2

(12) United States Patent
Owen, III

(10) Patent No.: US 12,746,561 B2
(45) Date of Patent: Sep. 29, 2026

(54) SPRAY BOTTLE ASSEMBLY

(71) Applicant: Miller W. Owen, III, Panama City, FL (US)

(72) Inventor: Miller W. Owen, III, Panama City, FL (US)

( * ) Notice: Subject to any disclaimer, the term of this patent is extended or adjusted under 35 U.S.C. 154(b) by 116 days.

(21) Appl. No.: 18/936,961

(22) Filed: Nov. 4, 2024

(65) Prior Publication Data

US 2025/0144652 A1 May 8, 2025

Related U.S. Application Data

(60) Provisional application No. 63/547,203, filed on Nov. 3, 2023.

(51) Int. Cl.
*B05B 11/00* (2023.01)
*B05B 11/10* (2023.01)

(52) U.S. Cl.
CPC ...... *B05B 11/0089* (2013.01); *B05B 11/0037* (2013.01); *B05B 11/1057* (2023.01)

(58) Field of Classification Search
CPC ............. B05B 11/0089; B05B 11/0037; B05B 11/1057; B05B 11/1083; B05B 12/1409; B05B 12/1418; B05B 11/1081; B05B 11/1011
See application file for complete search history.

(56) References Cited

U.S. PATENT DOCUMENTS

| | | | | |
|---|---|---|---|---|
| 5,398,846 A * | 3/1995 | Corba | B05B 11/0044 | 222/145.5 |
| 5,769,275 A * | 6/1998 | Boehmer | B05B 11/1081 | D9/684 |
| 2004/0206775 A1* | 10/2004 | Holmes | B05B 11/1081 | 222/94 |
| 2005/0029296 A1* | 2/2005 | Hansen | D06L 4/10 | 222/145.5 |
| 2006/0021996 A1* | 2/2006 | Scott, III | B65D 81/3283 | 220/717 |
| 2010/0185322 A1* | 7/2010 | Bylsma | B01F 35/20 | 222/145.5 |
| 2025/0144652 A1* | 5/2025 | Owen, III | B05B 11/1057 | |

FOREIGN PATENT DOCUMENTS

| | | | |
|---|---|---|---|
| CA | 2977635 A1 * | 2/2019 | B05B 11/0008 |
| CN | 200988015 Y * | 12/2007 | B05B 11/1081 |
| EP | 0026902 A1 * | 4/1981 | B05B 11/1081 |

* cited by examiner

*Primary Examiner* — Bob Zadeh
(74) *Attorney, Agent, or Firm* — Adrienne C. Love

(57) ABSTRACT

The spray bottle assembly has a trigger sprayer assembly, dip tube combiner, trigger sprayer adapter, dilution wheel, bottle adapter, at least two dip tubes and a bottle configuration. The bottle configuration has at least two containers that engage with a bottle adapter. Bottle adapter has two openings that accept at least two dip tubes extending into at least two containers. On the upper flat portion of bottle adapter cuffs that engage with detents on a dilution wheel surround the openings that are fluidly connected to the at least two dip tubes. The detents on dilution wheel determine how much fluid passes through each opening, thus allowing different proportions of fluid from each container to pass through to the dip tube combiner housed within trigger sprayer adapter. Dip tube combiner combines the two fluids prior to being expelled by prior art trigger sprayer assembly.

20 Claims, 18 Drawing Sheets

SPRAY BOTTLE ASSEMBLY

CROSS-REFERENCES TO RELATED APPLICATIONS

Pursuant to the provisions of 37 C.F.R. § 119 (e), this non-provisional application claims the benefit of an earlier-filed provisional patent application. The earlier application was assigned U.S. Ser. No. 63/547,203.

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to the field of devices made for storing and dispensing liquid components. More specifically, the invention relates to a spray bottle assembly that is able to select a desired ratio of liquid from multiple sections of a bottle to dispense a set amount of liquid solution.

2. Description of the Related Art

Spray bottles provide a user-friendly nozzle that can easily dispense an even stream of liquid, allowing for precise and controlled applications of liquids. A detailed view of a prior art spray bottle is shown in FIG. 1. The prior art spray bottle 10 has a prior art bottle 12, a prior art dip tube 14 and a prior art trigger sprayer assembly 16. Prior art bottle 12 is capable of holding an amount of liquid to be stored prior to dispensing. Dip tube 14 extends from the trigger sprayer assembly 16 into the liquid, enabling the dispensing of liquid from the bottle 12. Upon actuating the trigger on the prior art trigger sprayer assembly 16, the liquid in the bottle 12 dispenses as a spray through the nozzle on the trigger sprayer assembly 16.

When the user pulls the trigger lever on the trigger sprayer assembly it activates a small positive displacement pump. The pump acts directly on the fluid, drawing the liquid up the dip tube and out a small hole on the spray nozzle.

Cleaning solutions are often delivered in spray bottles. Manufacturers typically mix a cleaning solution from several different base liquids prior to filling the bottles with that cleaning solution. Different mixtures of are often provided for different cleaning purposes or surfaces. For example, stained tile or flooring may require a stronger (less diluted) cleaning solution to remove grime, while a kitchen countertop may require a more diluted cleaning solution to clean effectively and avoid damaging the surface. This requires extra effort and expense. Manufacturers must mix and label different cleaning products for different purposes even if the same two base liquids are used. Further, consumers are required to purchase multiple different products for different cleaning purposes, even if the products are made of the same base ingredients.

Prior art spray bottles did not have a method of delivering two or more liquids in selected variable amounts from multiple sections of a container where a set volume of liquid is ultimately dispensed. What is needed is one spray bottle that will enable the user to perform a wide variety of tasks. The present invention achieves this objective by allowing the user to select from a number of predetermined liquid mix ratios.

BRIEF SUMMARY OF THE INVENTION

A spray bottle assembly having a trigger sprayer assembly, a trigger sprayer adapter housing a dip tube combiner, a dilution wheel, a bottle adapter including a dip tube receiver and an axle with a spring, and a bottle configuration with either a divider wall or two separate containers. The trigger sprayer assembly can be any conventional trigger sprayer assembly that has a trigger and dip tube connection point. Trigger sprayer adapter includes a threaded portion that attaches to the trigger sprayer assembly. The dip tube combiner is a Y-adapter that combines two dip tubes into one, and attaches at a first end to the trigger sprayer assembly at the dip tube connection point creating a fluid connection to the trigger sprayer assembly and nozzle. Dip tube combiner is housed within trigger sprayer adapter and its second (split) end connects to the base (or upper dip tube receiver) of trigger sprayer adapter at two openings. The base of trigger sprayer adapter has two raised cuffs surrounding the two openings. These openings are capable of engaging with a series of detents on the top of the dilution wheel. Each detent has a concave surface and all but one detent includes a circular opening with diameters of variable size. A flat portion of bottle adapter (in one embodiment, a dip tube receiver) having two opening encircled by two raised cuffs sits below dilution wheel. The raised cuffs on the base (or upper dip tube receiver) and the raised cuffs on the bottle adapter (or dip tube receiver) are capable of creating a fluid connection with one another by engaging with detents in the dilution wheel. The dip tube receiver receives at least two dip tubes that extend into bottle. In one embodiment, an axle having a flange, two openings and a rod featuring a keyway, assists in connecting the component parts together. A spring surrounds the rod and rests on the flange. The dip tube receiver rests directly on the spring. In a second embodiment, the bottle adapter includes a rod featuring a keyway, which assists in connecting the component parts.

The base of the trigger sprayer adapter (upper dip tube receiver), dilution wheel and bottle adapter (or dip tube receiver) each have a central bore designed to accept the rod. The keyway on the rod, aligns with a key on the base (upper dip tube receiver) and a key on the bottle adapter (or dip tube receiver). The keys are proximate the central bore such that the keyway on the rod can accept the keys on each component part. Importantly, the dilution wheel does not include a key. This allows the dilution wheel to rotate with respect to the keyed trigger sprayer adapter and bottle adapter (or dip tube receiver), as further described below. An assembly nut secures the end of the rod and bears against the base of the trigger sprayer adapter. Although an assembly nut is described as an option for securing the assembly together as described, any known method of securing the component parts together could be utilized. For example, the rod could be secured at the top with a component piece that is formed by press fit or snap fit. A press fit assembly would allow the rod to fasten to another mating part to produce a secure joint by the use of a machine or hydraulic press. The machinery could set the length of the rod to create the ideal tension between the adjoining component parts. For example, an ideal tension allows the dilution wheel to rotate with respect to the bottle adapater and the base of the trigger sprayer adapter, but does not compromise the watertight seal created between those same component parts.

Returning to the connection of these component parts, the key and keyway prevent bottle adapater and trigger sprayer adapter from rotating. As described above, the lack of a key on the dilution wheel allows for its rotation about the axis of the rod. When dilution wheel is rotated, the raised cuffs are able to slip in and out of detents due to their graded surfaces (and the concave surface of the detents). In one embodiment, the depression of the spring creates an upward force that encourages the raised cuffs (and therefore the opening) to enter detents. When this occurs the raised cuffs click into place created a watertight seal. The dip tubes continue downward from dip tube receiver (passing through flange at base of axle) into a first container and a second container respectively.

In operation a user pulls trigger of the trigger sprayer assembly thereby activating the positive displacement pump within trigger sprayer assembly. This creates a negative pressure that pulls a set amount of solution upward out of dip tubes. The selected ratio of that solution depends on which detents bottle adapter is aligned with at the time the trigger is pulled. As an example, if the bottle adapter is aligned with a detent with no opening and a detent with a large opening, the solution will include 100% of the first liquid and 0% of the second liquid. If the bottle adapter is aligned with two detents including two equal openings, the solution will include equal amounts of the first and second liquid. Any combination of the two liquids is possible by varying the diameter of the openings on the detents. In the present instance five (5) solutions are available to the user. The spray bottle assembly therefore allows for the easy and efficient dispensing of five different types of cleaning solutions by simply turning a dilution wheel to elect the desired ratio of each liquid to include in the desired solution. This provides an efficient, cost effective way for the user to utilize one product for various purposes. These and other features, aspects, and advantages of the present spray bottle assembly are better understood with reference to the following description and accompanying drawings.

REFERENCE NUMERALS IN THE DRAWINGS

Figure 1:
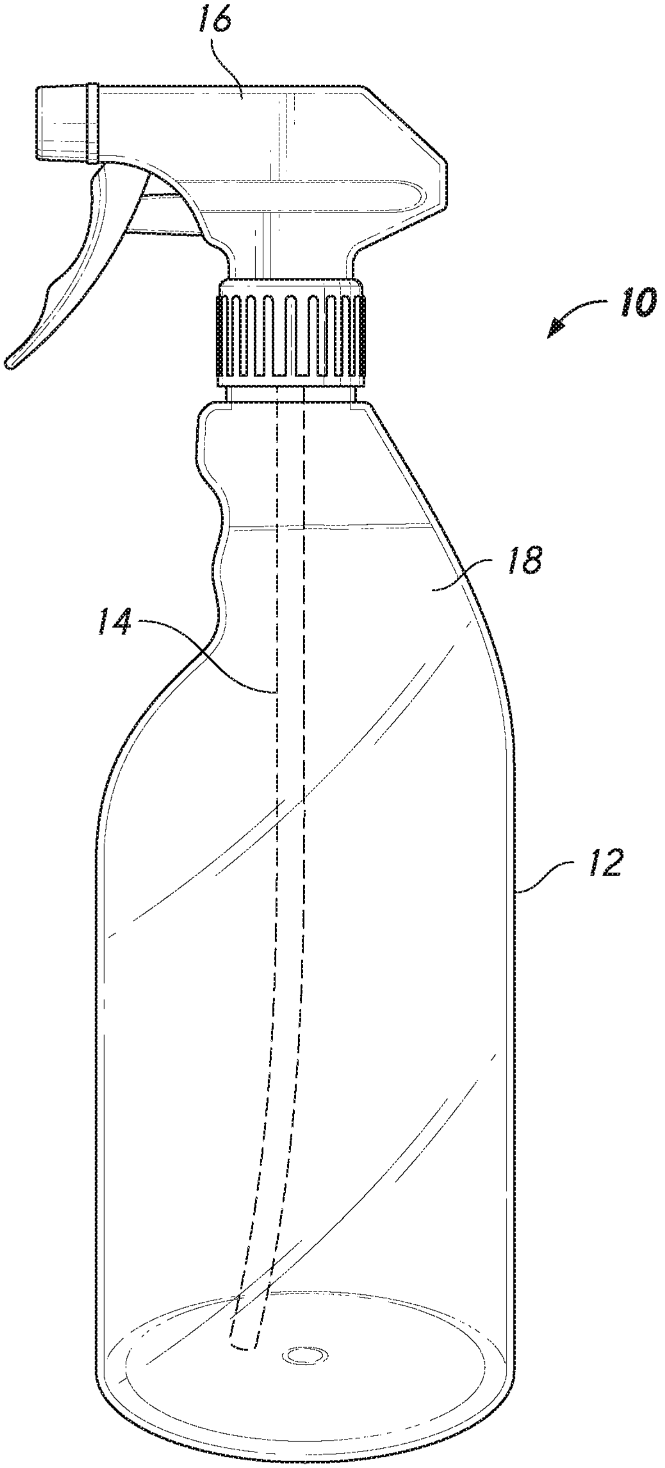
FIG. 1 (PRIOR ART)
FIG. 1 is a perspective view, showing a prior art spray bottle.

10 prior art spray bottle
12 bottle
14 dip tube
16 trigger sprayer assembly
18 liquid
20 spray bottle assembly
22 first dip tube
23 second dip tube
24 first container
26 second container
28 divider wall
30 bottle adapter
31 bottle adapter
32 axle
34 dip tube receiver
36 dilution wheel
38 trigger sprayer adapter
40 assembly nut
42 dip tube combiner
44 bottle configuration
46 spring
48 flange
50 hole
52 rod
53 rod
54 bore
56 cuff
58 base
60 flat portion
61 flat portion
62 openings
64 detents
66 indicators
68 cuff
70 threaded portion
72 bore
74 key
76 keyway
78 mouth
80 post
82 captive nut
84 main body
86 spring-loaded ball plunger
88 ball detent

DETAILED DESCRIPTION OF THE INVENTION

Figure 2:
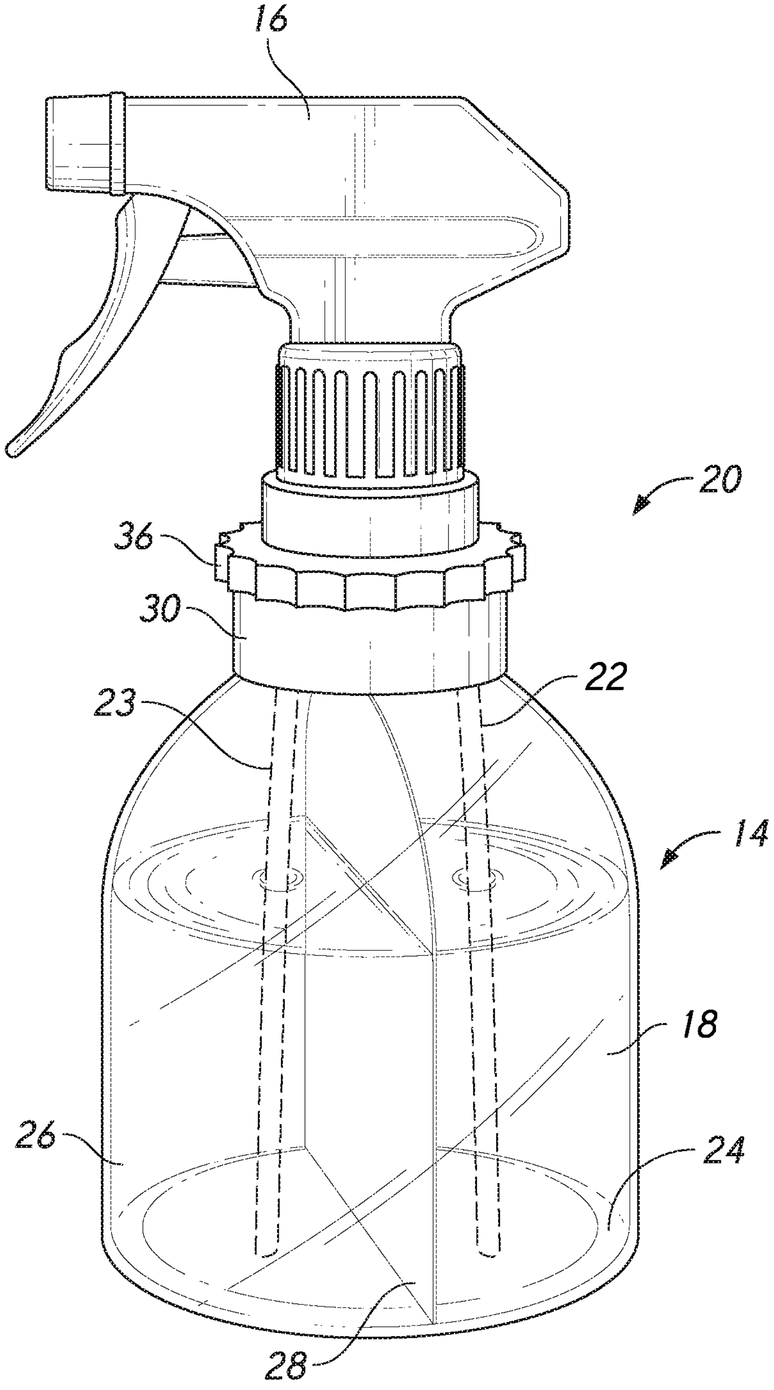
FIG. 2 is a perspective view, showing a first embodiment of the spray bottle assembly.
Figure 3:
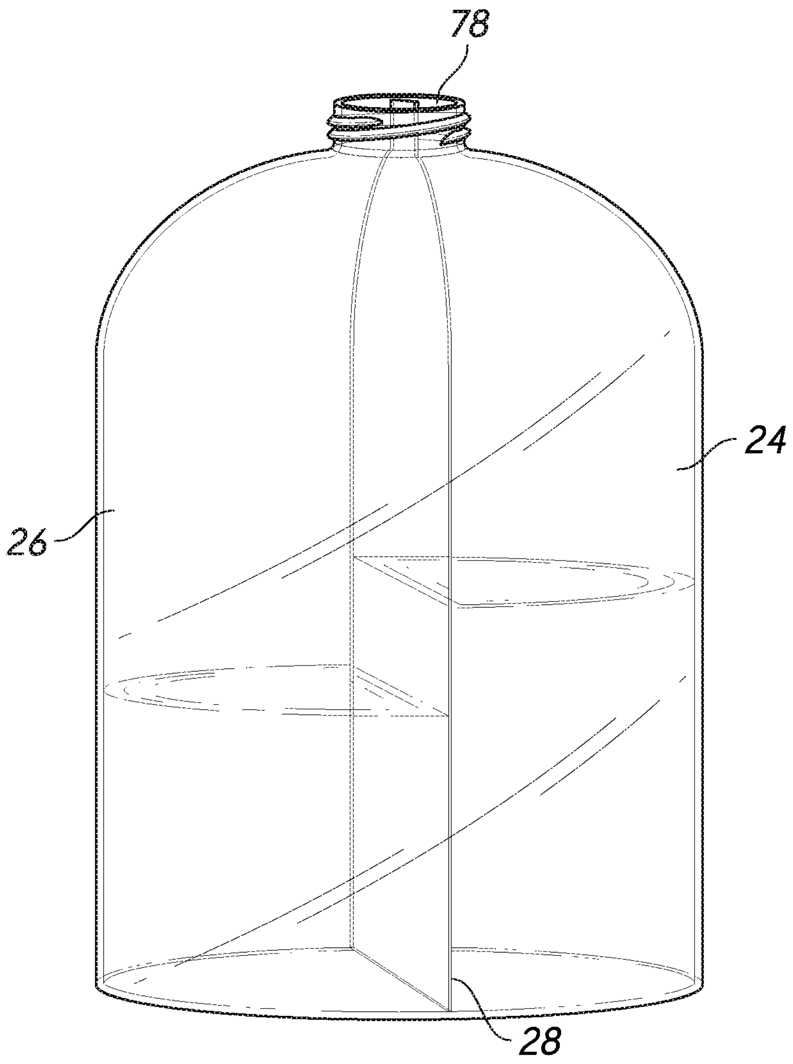
FIG. 3 is a cut-away view, showing the bottle configuration of the spray bottle assembly.
Figure 4:
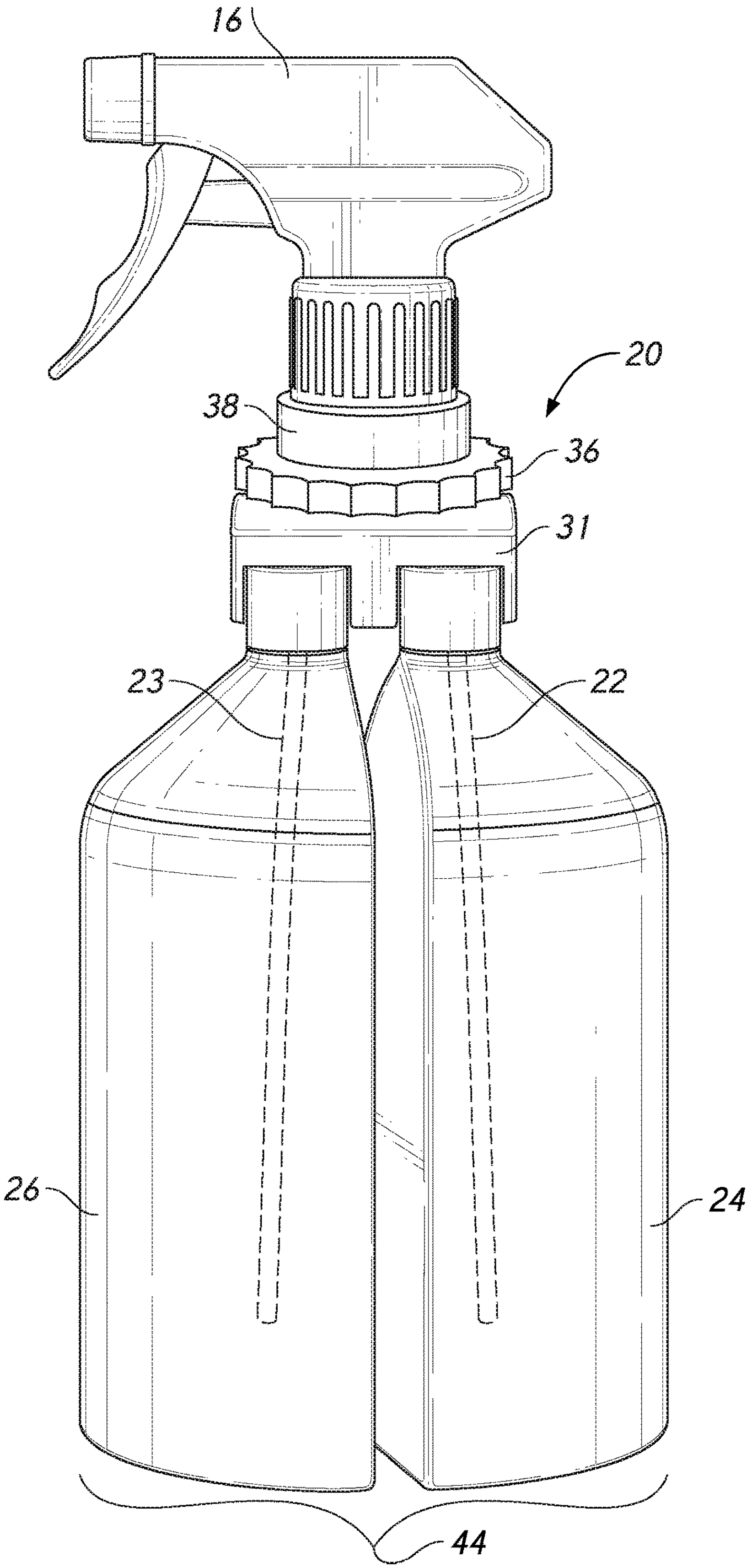
FIG. 4 is a perspective view, showing a second embodiment of the spray bottle assembly.
Figure 5:
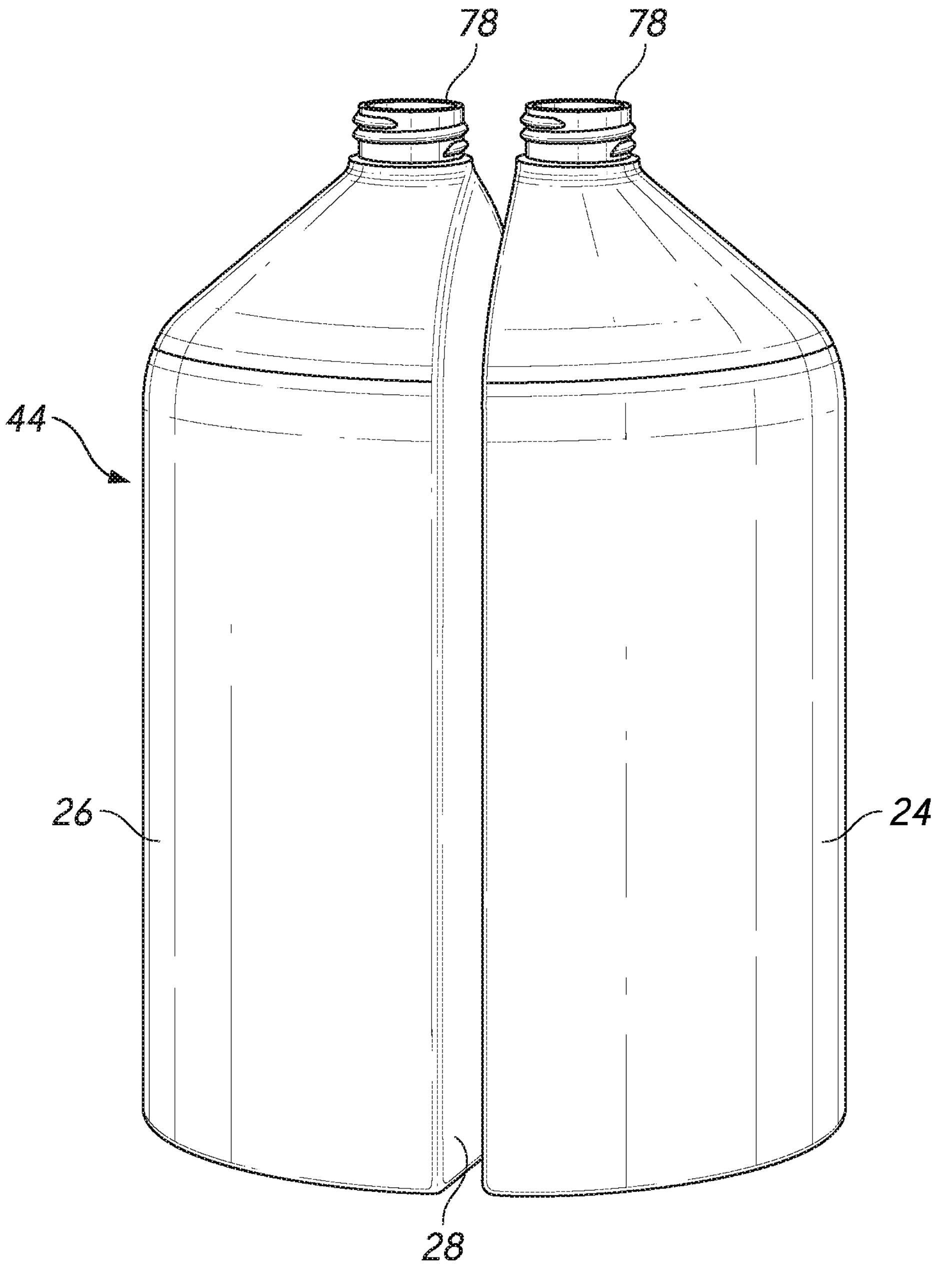
FIG. 5 is a perspective view, showing of the bottle configuration of the spray bottle assembly.

The spray bottle assembly 20 is illustrated in FIG. 2. The spray bottle assembly 20 has a number of component parts that allow the uptake of a set volume of fluid from at least two containers. The volume of fluid that is dispensed is approximately equal for each spray; however the selected amount of fluid from each container can be drawn in differing amounts. FIGS. 2 and 4 illustrate component parts of the spray bottle assembly 20 that are visible when assembled. Bottle configuration 44 is made up of a first and second container 24, 26 for holding liquid. There are two embodiments of the spray bottle assembly 20. In the first embodiment, shown in FIGS. 2 and 3, bottle configuration 44 is one unit having one mouth 78 and a divider wall 28 through its center forming a first and second container 24, 26. The second embodiment is illustrated in FIGS. 4 and 5. In the second embodiment, bottle configuration 44 includes two separate units made up of a first and second container 24, 26 each having a separate mouth.

In each embodiment bottle adapter 30, 31 attaches to the top of bottle 44. Dilution wheel 36 sits between bottle adapter 30, 31 and trigger sprayer adapter 38. A user can rotate dilution wheel 36 to choose a setting to select variable amounts of liquid from first and second container 24, 26 as described herein. Trigger sprayer adapter 38 includes a top portion that has a series of threads (shown in FIGS. 3 and 5) allowing for the attachment of trigger sprayer assembly 16. Trigger sprayer top 16 is the same as a prior art trigger sprayer top and any known trigger sprayer top having a dip tube entry connection will function in connection with the present spray bottle assembly 20. When a user activates trigger, the present spray bottle assembly 20 will deliver a solution made up of the liquid from the bottle configuration 44 for use. The combination of the two liquids delivered within the solution will be dependent on the setting the user selects from the dilution wheel 36. Although the term “dilution” is used to describe the “dilution wheel” the term should not be used to limit the invention to only dilute or weaken the overall solution. Instead, the invention could combine two equally strong liquids.

Figure 6:
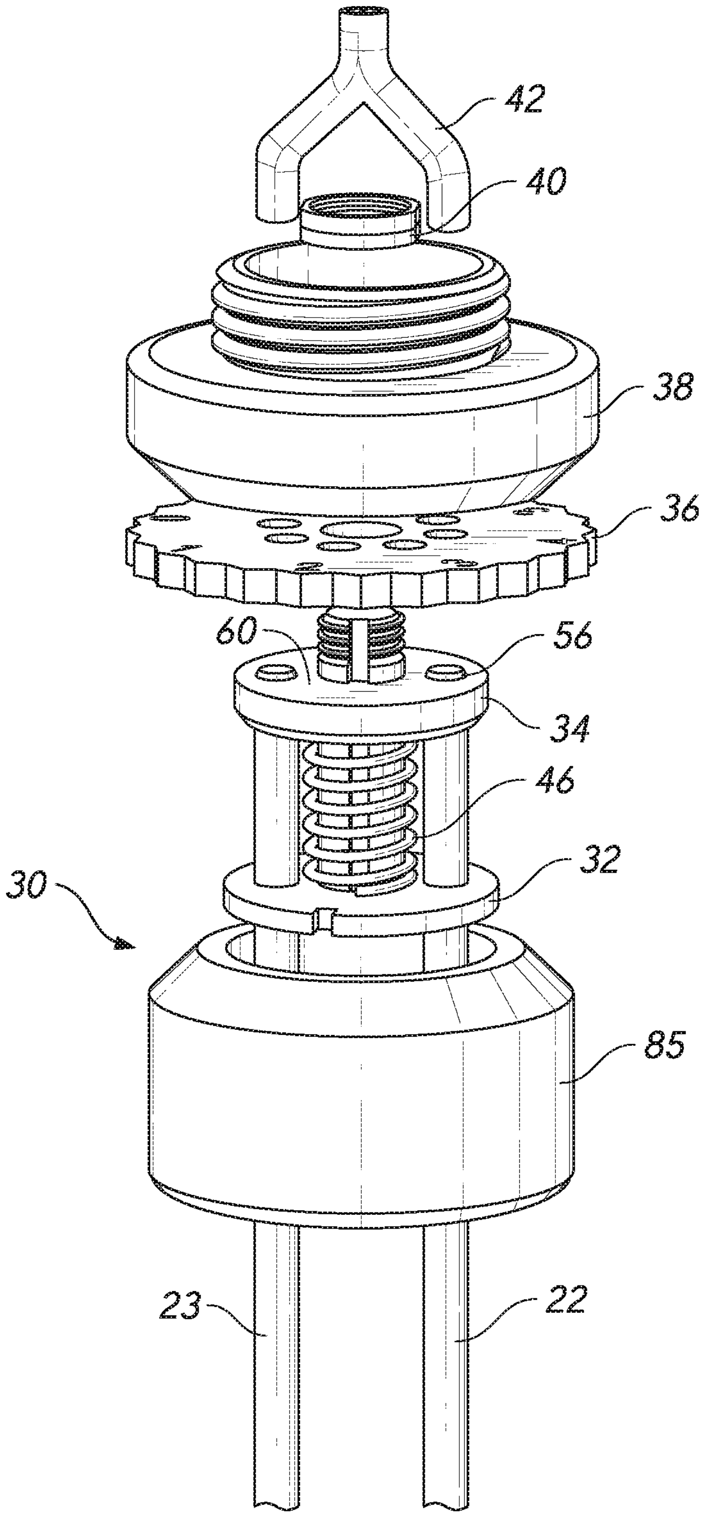
FIG. 6 is an exploded view, showing component parts of the spray bottle assembly.
Figure 7:
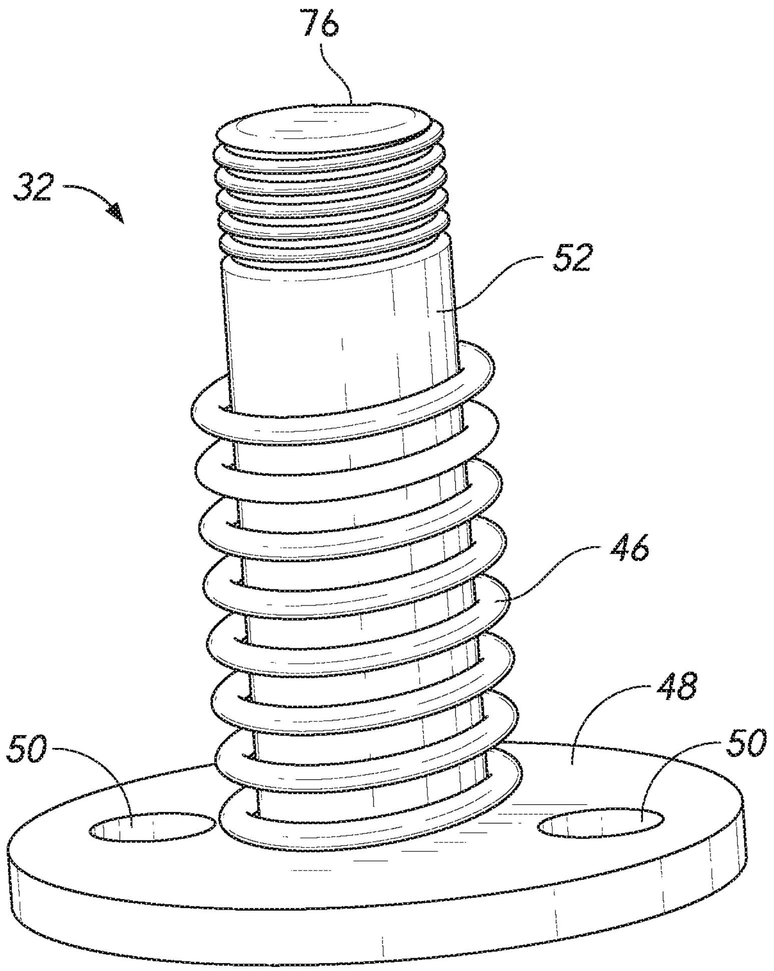
FIG. 7 is a perspective view, showing the axle of the spray bottle assembly.

The components of the first embodiment of spray bottle assembly 20 are illustrated in an exploded view in FIG. 6. Bottle adapter 30 includes main body 30, dip tube receiver 34, axle 32 and spring 46 when fully assembled. First and second dip tubes 22, 23 fit through axle 32. Axle 32 is shown in FIG. 7. Axle 32 has a flange 48, at least two holes 50 and a rod 52 with a keyway 76. Rod 52 extends upward from the center of flange 48 and includes a threaded portion on the upper end of rod 52. Although a threaded portion is included on the upper end of rod 52 for attachment to an assembly nut (further described herein), any known method of securing the end of rod 52 could be used. For example, a press fit assembly on an automated machine could be utilized. Spring 46 encircles rod 52 and rests on flange 48. Although spring is utilized to provide a restoring force to push dip tube receiver 34 and cuff 56 against dilution wheel 36, any other method of creating a force to provide a tight seal could be utilized. For example, if cuff 56 is a rubber O-ring, cuff 56 itself can provide an elastic force that compresses when detents 64 of dilution wheel 36 are not aligned with cuff 56 and expands when detents 65 are aligned with cuff 56, thereby creating a seal. At least two holes 50 of axle 32 allow dip tubes 22, 23 to pass unobstructed through flange 48 of axle 32, as illustrated in FIG. 7. Returning to FIG. 6, at least two dip tubes 22, 23 engage with dip tube receiver 34 at an engagement point on the underside of dip tube receiver. The reader will appreciate that dip tube receiver 34 could be fully integrated with at least two dip tubes 22, 23. Axle 32 and dip tube receiver 34 are housed in bottle adapter 30 (shown in FIG. 2). Dip tube receiver 34 rests on spring 46, the operation and functionality of the combination of these two components is further described and illustrated herein. Dilution wheel 36 sits between dip tube receiver 34 and trigger sprayer adapter 38. Trigger sprayer adapter houses an assembly nut 40 and dip tube combiner 42. Assembly nut 40 receives the threaded portion of rod 52 on axle 32 in order to secure the components together. As previously described, any method of securing the components together could be utilized. However, it is important that the component parts are secured together with a set tension that allows dilution wheel to rotate about the axis of rod 52 while still ensuring the watertight seal of the dip tubes, dilution wheel and other component parts. Dip tube combiner 42 is a “Y” shaped adapter, which engages with trigger sprayer adapter 38 at its split end (second end), and at its combined end (first end) dip tube combiner 42 engages with trigger sprayer assembly 16. In a conventional prior art spray bottle the dip tube extends from trigger sprayer assembly 16 downward and directly into container.

Figure 8:
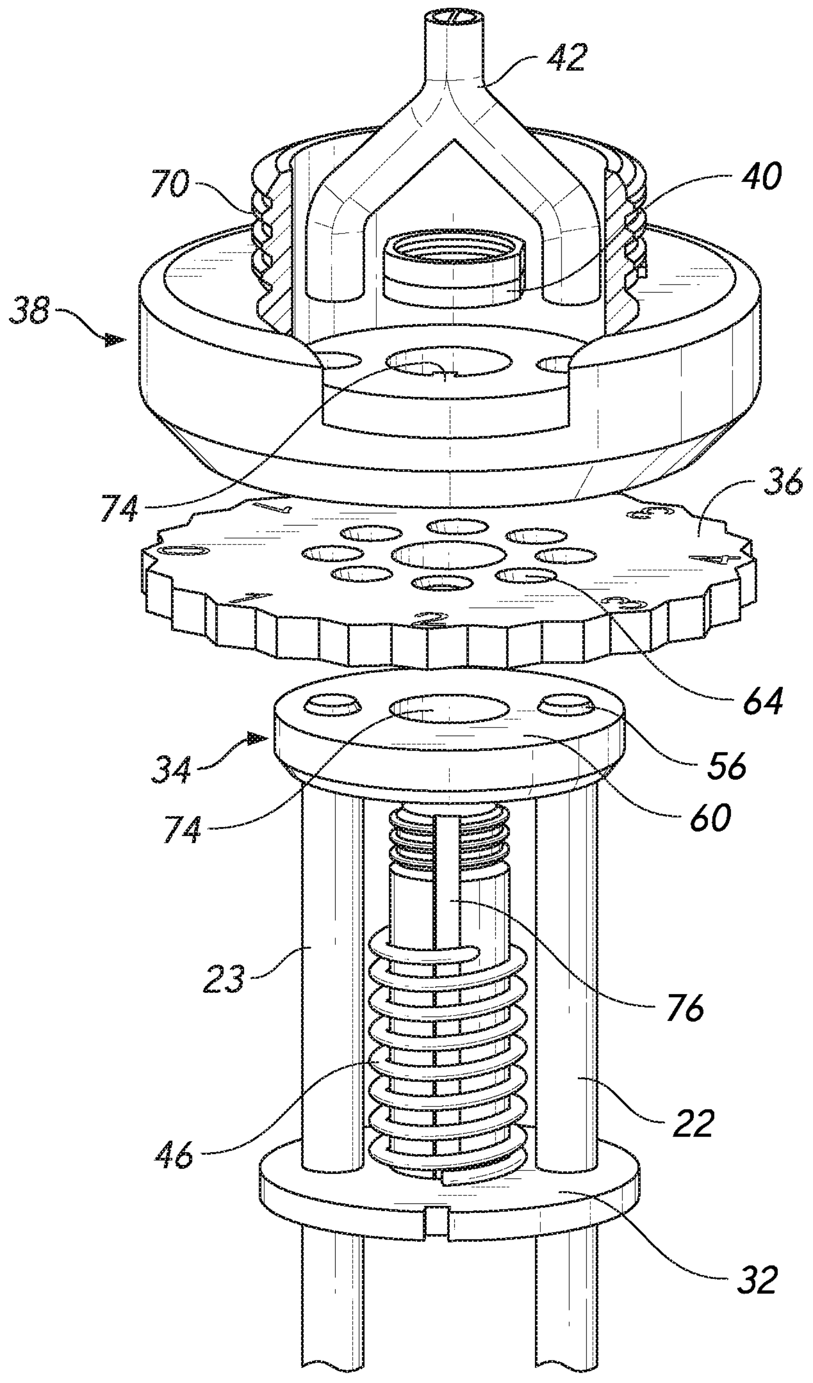
FIG. 8 is an exploded view, showing component parts of the spray bottle assembly.

An exploded view of several of the component parts is illustrated in FIG. 8. Dip tube receiver 34 has a flat portion 60 that includes two openings 62 for the engagement of dip tubes 22, 23. Dip tubes 22, 23 engage on the bottom of dip tube receiver at the two openings 64. A raised cuff 56 around the outside of the openings on the top of flat portion 60 assists in a watertight engagement. Lower surface of dip tube receiver rests on spring 46, which pushes dip tube receiver 34 upwards such that raised cuffs 56 can engage securely with the bottom of dilution wheel 36. Dilution wheel 36 assists in this engagement by its inclusion of a series of detents 64 on its top and bottom. Additionally, dilution wheel 36 can be made from a material such as rubber (or synthetic rubber) that has a high tear and tensile strength, resilience and resistance to abrasion, friction and water swell. The use of a material that has a resistance to abrasion allows the harder plastic material of dip tube receiver and trigger sprayer adapter to create a strong seal when in contact with dilution wheel 36. In the alternative, the dilution wheel 36 can be a harder plastic material while the raised cuffs 56 of dip tube receiver 34 and trigger sprayer adapter 38 are a material such as rubber (or synthetic rubber) with a high tensile strength to create the required seal.

Detents 64 have a concave inner surface and include different sized openings. Bottle adapter 38 includes a base 58 having two openings and a bore. Openings on base 58 have a raised cuff 68 surrounding each opening (on the top and bottom of base). The second (split) end of dip tube combiner 42 engages with the top side of base 58. Raised cuffs 68 around openings on the underside of base 58 are capable of engaging with detents 64 on the top of dilution wheel 36. Rod 52 with keyway 76 extends through base 58 (with key 74) of trigger sprayer adapter 38 and assembly nut 40 secures the component parts together. When assembly nut 40 is threaded onto rod 52, spring 46 is compressed and creates tension pushing dip tube receiver 34 gently upward. This action contributes to the watertight engagement of dip tubes 22, 23 through dip tube combiner 42 preventing leakage of fluid from the system.

Figure 9:
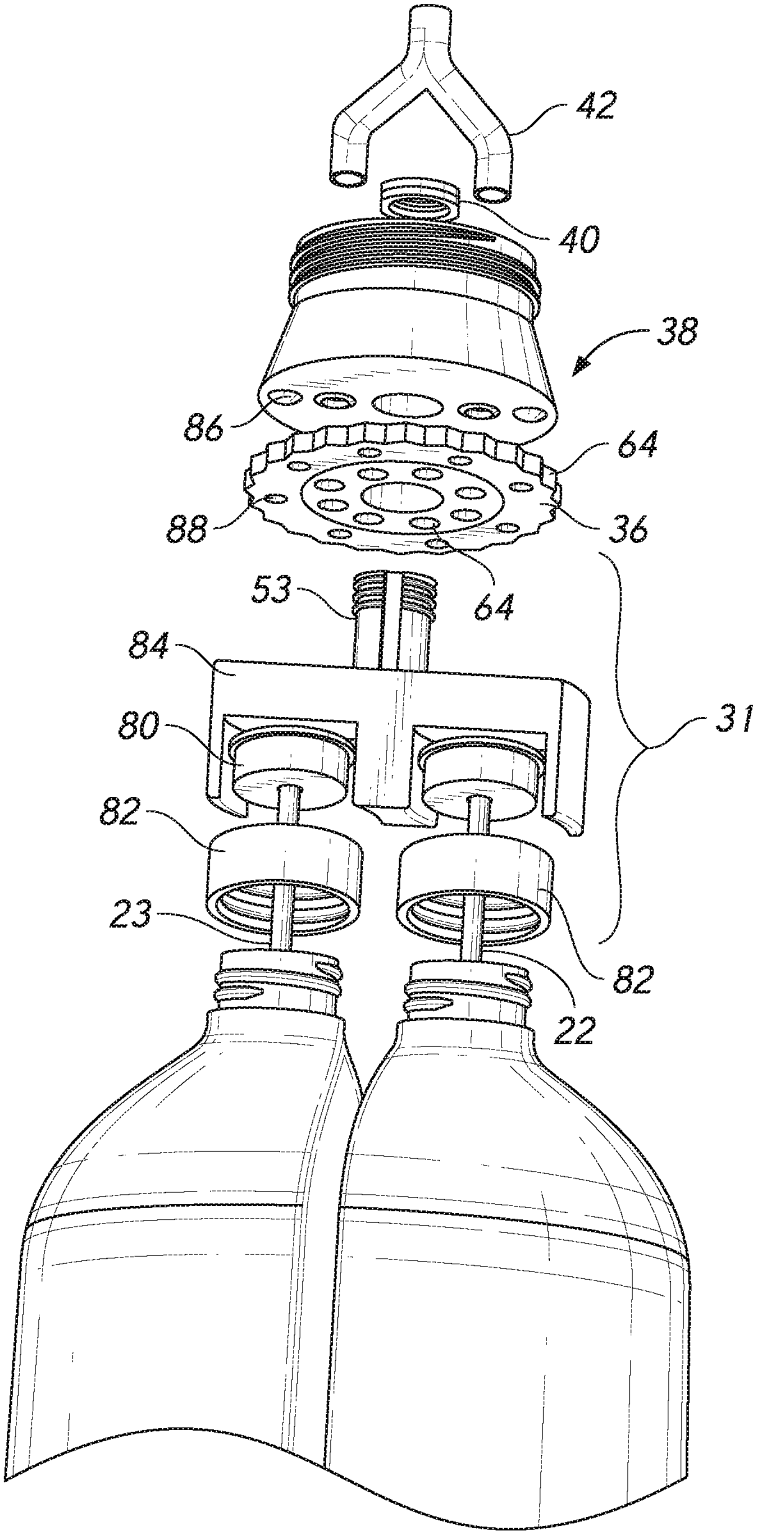
FIG. 9 is an exploded view, showing component parts of the spray bottle assembly.
Figure 10:
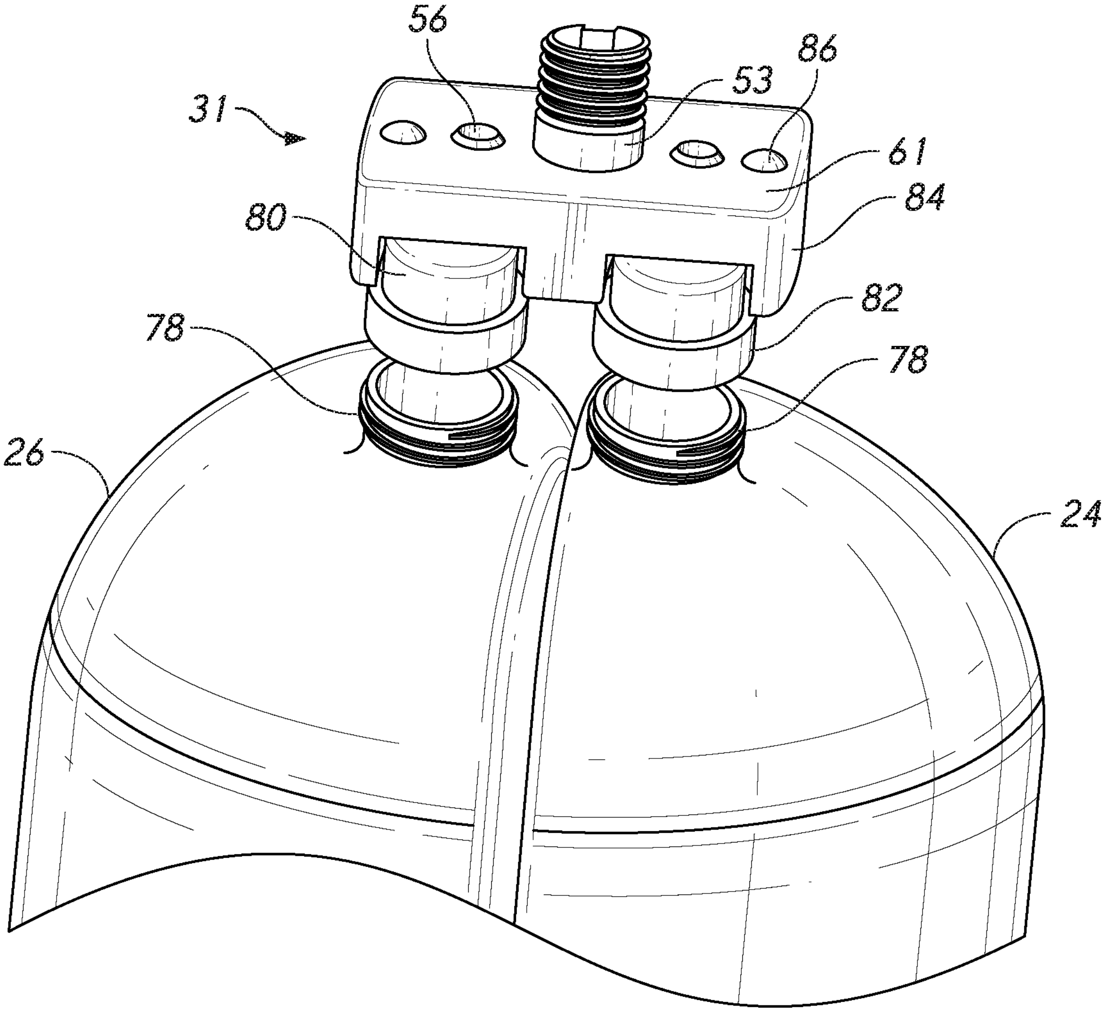
FIG. 10 is a perspective top view, showing component parts of the spray bottle assembly.

The components of the second embodiment of spray bottle assembly 20 are illustrated in FIGS. 9 and 10. The reader will appreciate that the functionality of the first and second embodiments are substantially the same. All component parts from the dilution wheel 36 upward, as shown in FIGS. 9 and 10, are identical. Dilution wheel 36 sits between trigger sprayer adapter 38 and bottle adapter 31. Trigger sprayer adapter houses an assembly nut 40 and dip tube combiner 42. Assembly nut 40 receives the threaded portion of rod 53 which is integrated with flat portion 61 of bottle adapter 30 and assists in securing the components together. As previously described, any method of securing the components together, such as a press-fit assembly, could be utilized. However, it is important that the component parts are secured together with a set tension that allows dilution wheel to rotate about the axis of rod 53 while still ensuring the watertight seal of the dip tubes, dilution wheel and other component parts. Dip tube combiner 42 is a "Y" shaped adapter, which engages with trigger sprayer adapter 38 at its split end (second end), and at its combined end (first end) dip tube combiner 42 engages with trigger sprayer assembly 16.

Bottle adapter 31 has main body 84, rod 53, flat portion 60, two posts 80 and two captive nuts 82. Flat portion 60 is on the upward facing side of bottle adapter 31 and includes two openings surrounded by two cuffs 56. The openings on flat portion 60 extend downward through main body 84 and the two posts 80. Each post 80 receives a dip tube 22, 23. Posts 80 are secured to main body 84 of bottle adapter 31 and are capable of engaging with two captive nuts 82 (or bottle tops) that can freely rotate about each post 80 but remain engaged. Each captive nuts 82 has a top and bottom opening. The top opening fits around post 80, while the bottom opening engages with the mouth 78 of first and second containers 24, 26. The raised cuffs 56 around the outside of the openings on the top of flat portion 60 assists in a watertight engagement. Raised cuffs 56 are made of a material that is resilient and has the ability to regain its original shape after compression, such as rubber or synthetic rubber. Raised cuffs 56 are compressed as dilution wheel 36 turns. Raised cuffs 56 rebound to their original shape when aligned with detents 64 on dilution wheel 36. As an optional component, a spring-loaded ball plunger 86 can be embedded in flat portion 61 of bottle adapter 31. A series of ball detents 86 can be provided on the underside of dilution wheel 36. Each ball detent 86 would correspond with detents 64. Thus, as the user rotates dilution wheel 36 the ball within the spring-loaded ball plunger would spring into the corresponding ball detents 86 providing the user with a tactile guide to confirm that the detents 64 are properly aligned with openings within raised cuffs 56. Although a series of ball detents 88 are illustrated, dilution wheel 36 could include less detents 88 and still achieve the desired effect. Additionally or alternatively, two spring-loaded ball plungers 86 could also be included on the underside of trigger sprayer adapter 38 with corresponding ball detents 88 on the top of dilution wheel.

Figure 11:
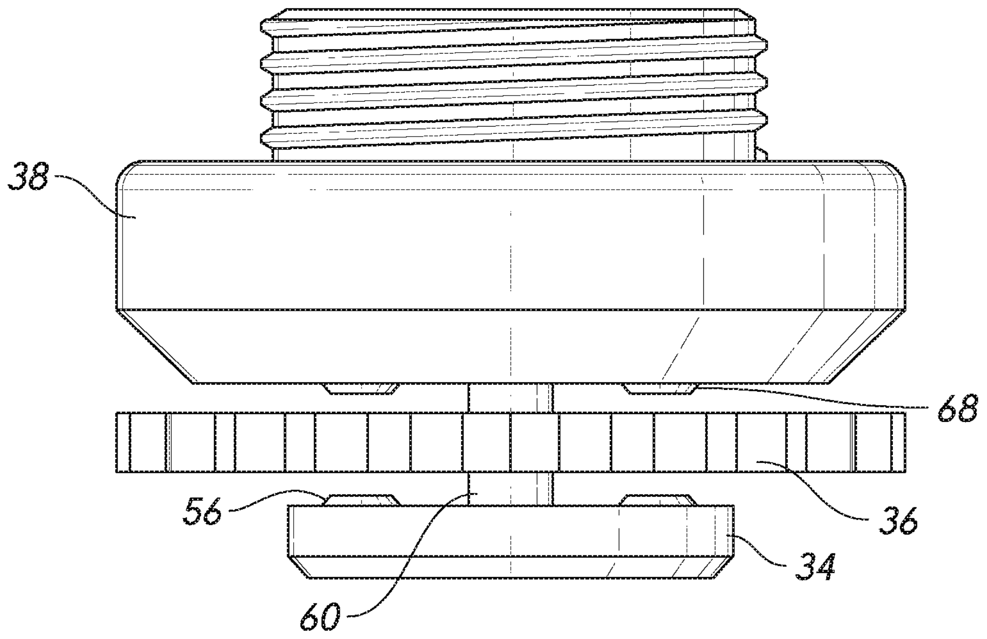
FIG. 11 is an elevation view, showing component parts of the spray bottle assembly.
Figure 12:
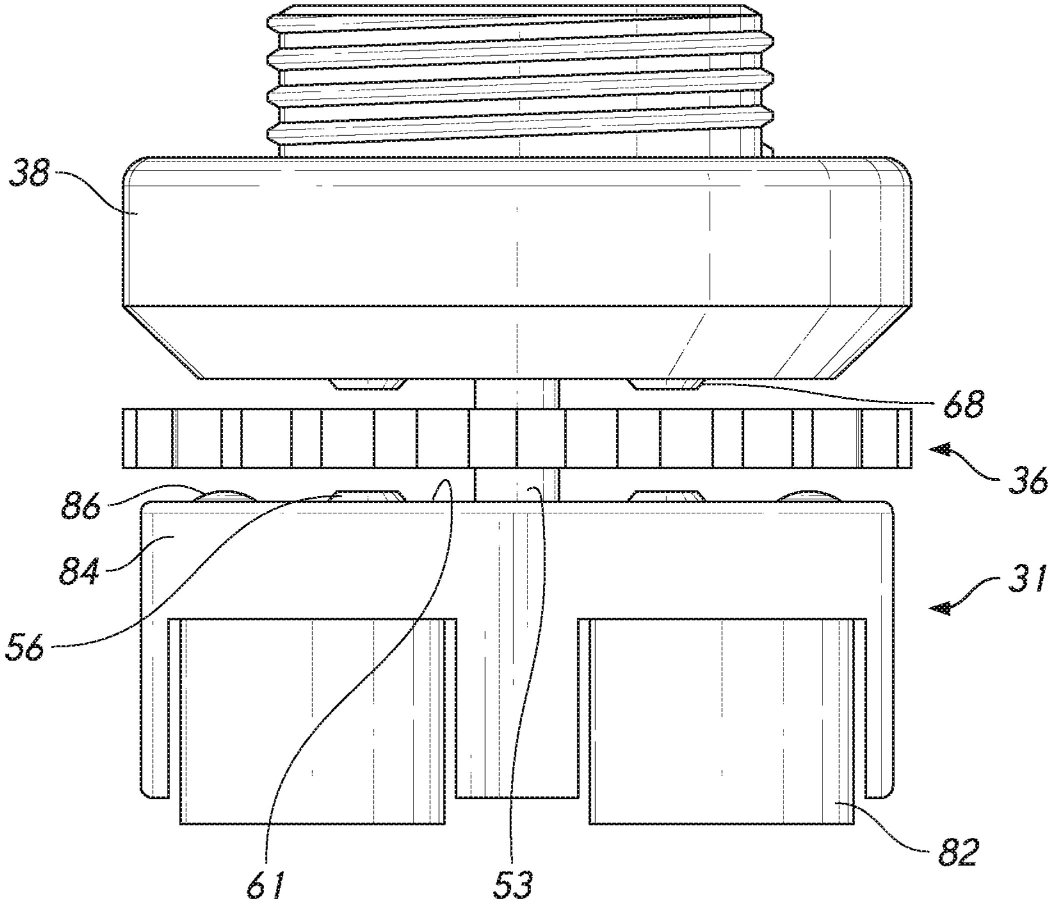
FIG. 12 is an elevation view, showing component parts of the spray bottle assembly.

The watertight connection between trigger sprayer adapter 38, dilution wheel 36 and flat portion 60, 61 of either dip tube receiver 34 or bottle adapter 31 is further illustrated in FIGS. 11 and 12. Trigger sprayer adapter 38 has an upper threaded portion to attach to trigger sprayer assembly 16. Raised cuffs 56 on flat portion 60 of dip tube receiver 34 in FIG. 11 (or flat portion 61 of bottle adapter 31 in FIG. 12) sit slightly above the top of flat portion 60, 61 of dip tube receiver 34, such that the raised cuffs 56 can engage with lower detents 64 (shown in FIG. 16) of dilution wheel 36. Above dilution wheel 36, raised cuffs 68 of trigger sprayer adapter 38 extend below base of trigger sprayer adapter 38. When raised cuffs 56, 68 and detents 64 are aligned and engaged, liquid can travel securely from dip tubes 22, 23 through each component part to dip tube combiner 42. Raised cuffs 68 are preferably made of rubber, or a material having similar characteristics to rubber, where the material acts as a gasket to secure a watertight seal with dilution wheel 36, which can be made of a similar material or of hard plastic. FIG. 12 also illustrates the optional spring-loaded ball plunger 86 that sits just above the flat portion 61 of bottle adapter and engages with additional ball detents 88 on the underside of dilution wheel 36.

Figure 13:
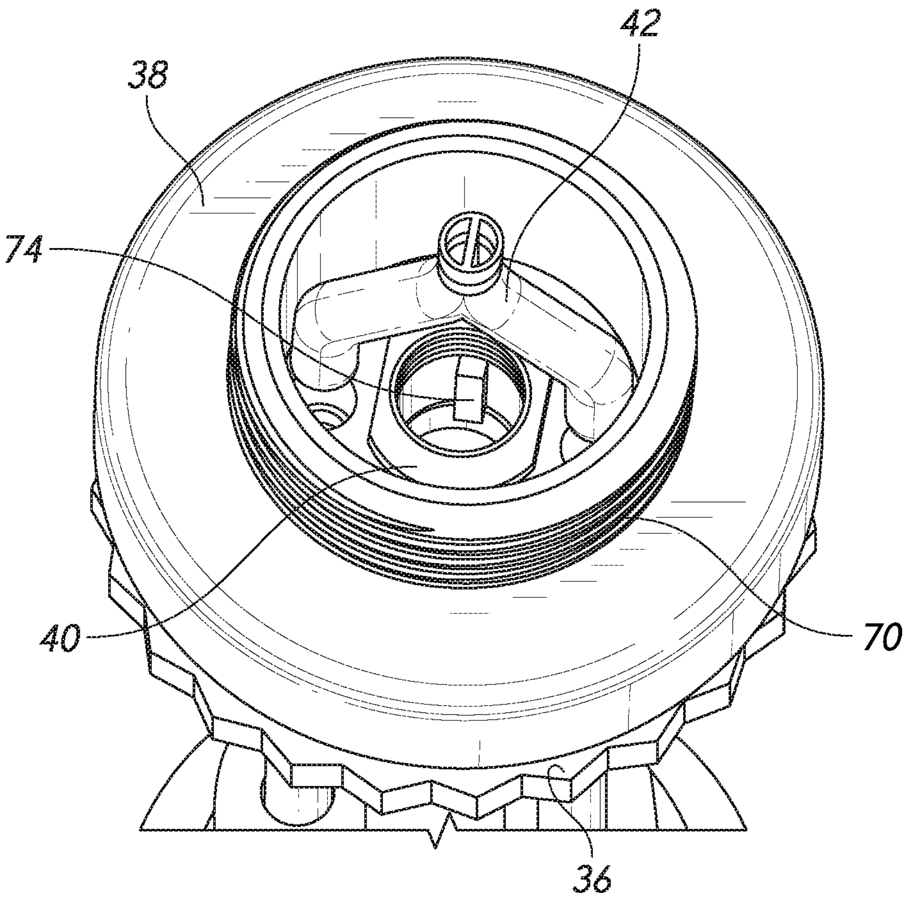
FIG. 13 is a perspective top view, showing component parts of the spray bottle assembly.

A perspective view looking down into trigger sprayer adapter 38 is illustrated in FIG. 13. This view is the same for each embodiment. A threaded portion 70 is provided to connect to trigger sprayer assembly 16. A bore 72 having a key 74 allows rod 52, 53 (not shown) having a keyway 76 to enter trigger sprayer adapter 38, securing trigger sprayer adapter 38 in place rotationally. Assembly nut 40 is installed around rod 52, 53 (not shown) and the second (split) end of dip tube combiner 42 is then inserted into base 58 of trigger sprayer adapter 38. Dip tube combiner 42 includes a divider wall that separates two chambers in dip tube combiner 42. In operation, dip tube combiner 42 combines two dip tubes into one. Dilution wheel 36 extends beyond the edge of trigger sprayer adapter 38 such that a user can adjust dilution wheel 36 by rotation. Dilution wheel 36 features knurled or serrated edges for ease of grip during rotation and is easily distinguished from spray bottle adapter and bottle adapter.

Figure 14:
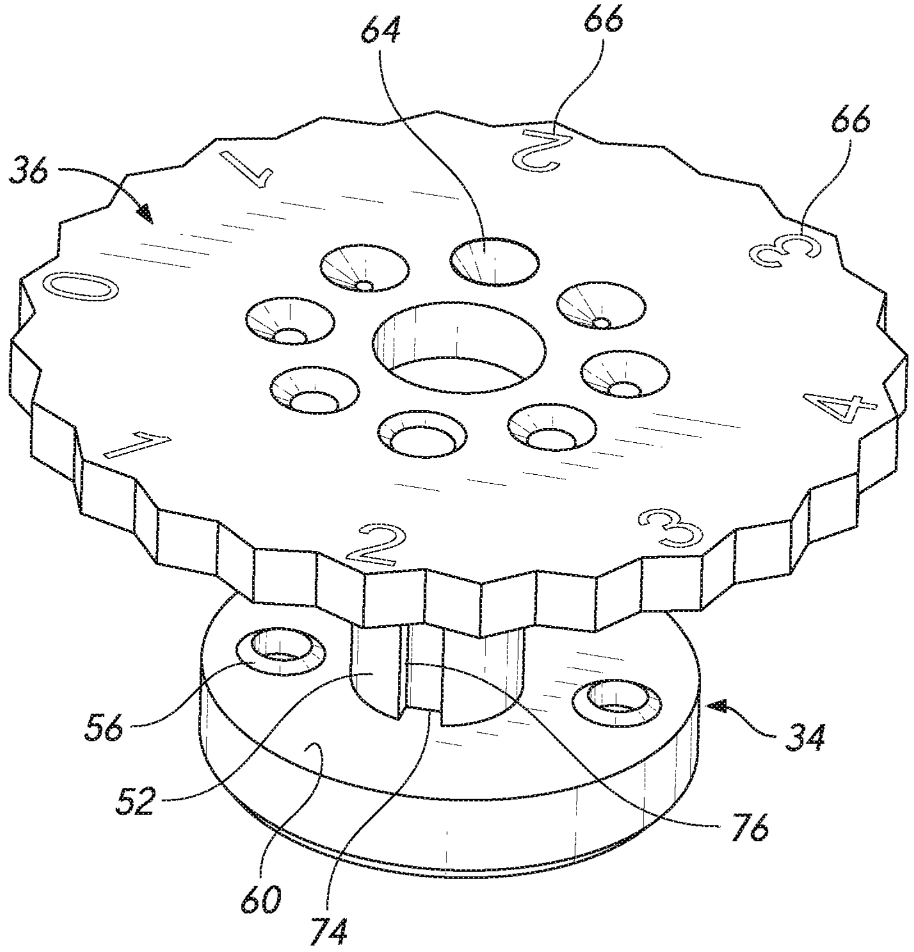
FIG. 14 is a perspective view, showing component parts of the spray bottle assembly.
Figure 15:
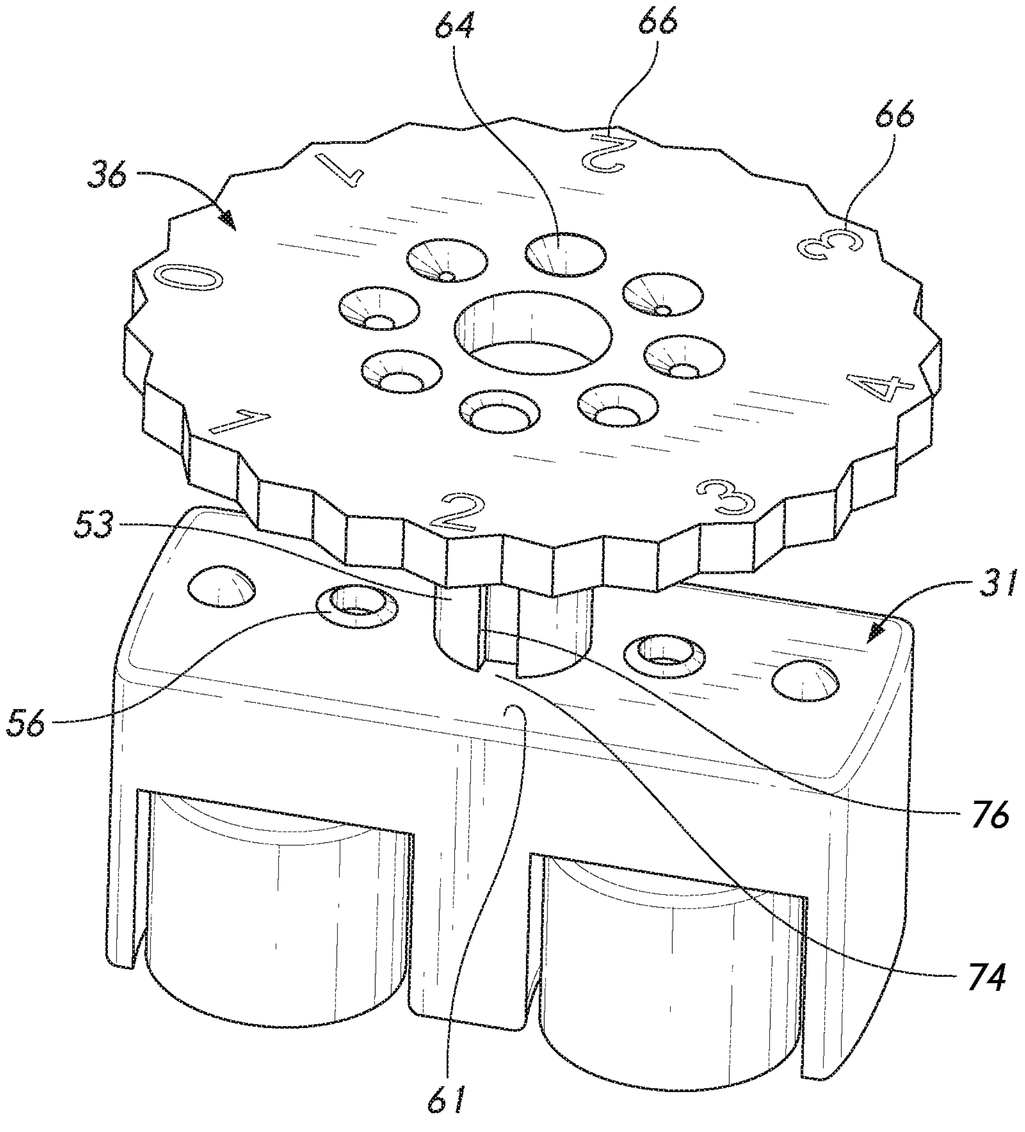
FIG. 15 is a perspective view, showing component parts of the spray bottle assembly.
Figure 16:
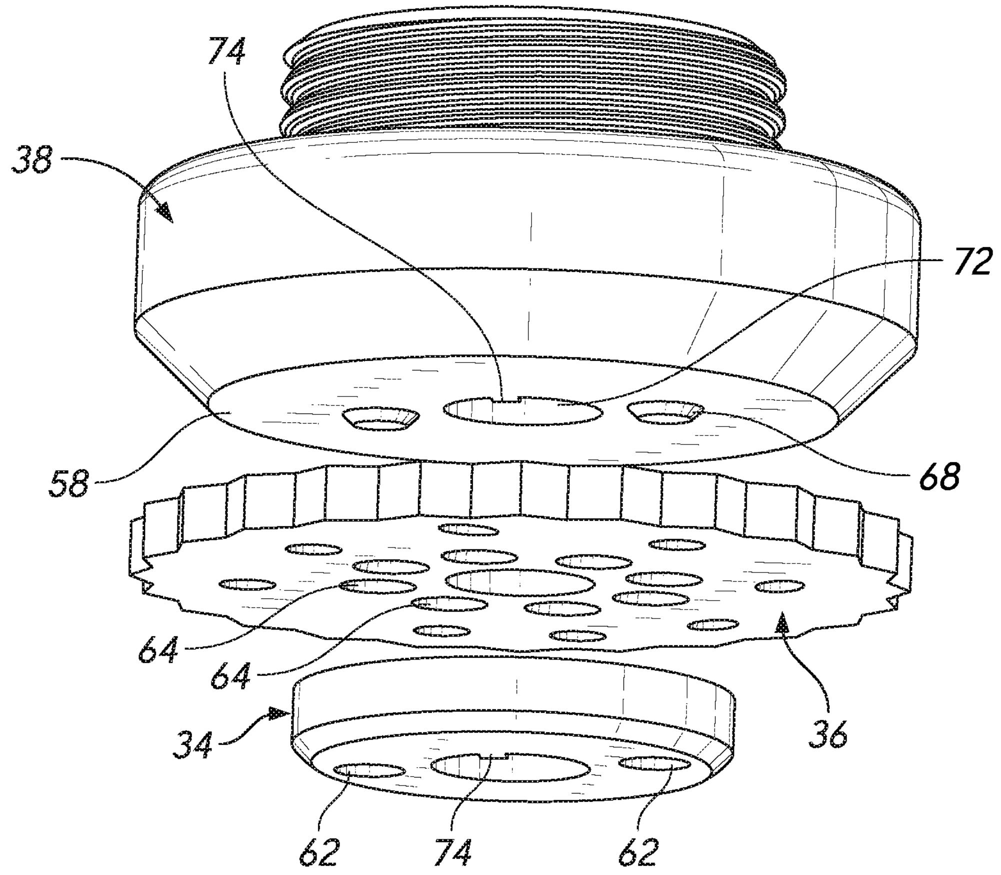
FIG. 16 is a perspective view, showing component parts of the spray bottle assembly.
Figure 17:
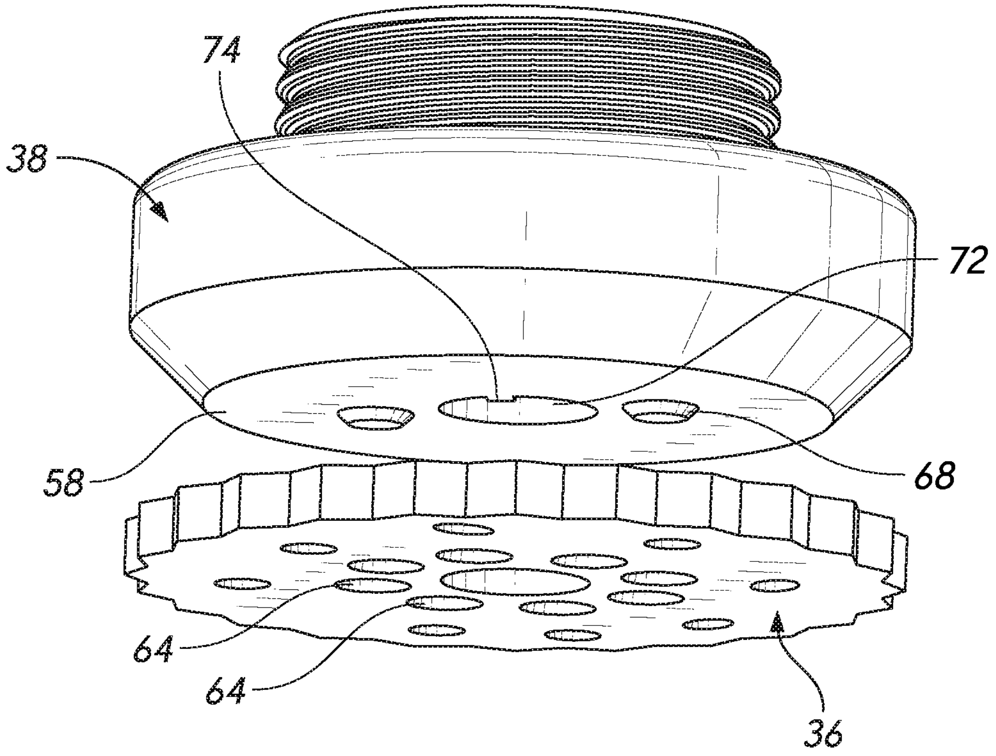
FIG. 17 is a perspective view, showing component parts of the spray bottle assembly.

FIGS. 14, 15, 16, 17 and 18 show the detailed structure of dilution wheel 36 and its interaction with other component parts. FIGS. 14 and 15 illustrate the top side of dilution wheel 36, while FIGS. 16 and 17 show the bottom side of dilution wheel 36. FIGS. 14 and 16 illustrate the alignment of dip tube receiver 34 and base 58 of trigger sprayer adapter 38 while FIGS. 15 and 17 illustrate the alignment of flat portion 61 of bottle adapter 31 and base 58 of trigger sprayer adapter 38. In one embodiment rod 52 with keyway 76 extends upward from axle 32 (shown in FIG. 8) through the bore on dip tube receiver 34 having a key 74 and dilution wheel 36 (no key) and into the central bore 72 of trigger sprayer adapter 38 having a key 74. As previously described axle 32 (shown in FIG. 8), includes rod 52 having a keyway 76, which has a spring 46 encircling it. Spring 46 pushes flat portion 60 of dip tube receiver 34 upward. Dip tube receiver 34 and trigger sprayer adapter 38 are rotationally stable with respect to dilution wheel 38—in other words, they are stationary while dilution wheel 38 can rotate about the axis of rod 52. This is due to the alignment and engagement of the key and keyway. Similarly, FIGS. 15 and 17 show the second embodiment, which also has a rod 53 with keyway 76 extending upward from flat portion 61 of bottle adapter 31 through the central opening on dilution wheel 36 (no key) and into the central bore 72 of trigger sprayer adapter 38 having a key 74. Bottle adapter 31 and trigger sprayer adapter 38 are rotationally stable with respect to dilution wheel 38, for the same reason as described above.

The top and bottom side of dilution wheel 38 include a series of detents 64 that are preferably concave in nature and include a series of different sized openings. The raised cuffs 56, 68 of flat portion 60 of dip tube receiver 34 (and flat portion 61 of bottle adapter 31) and trigger sprayer adapter 38 engage with detents 64 on the top and bottom side of dilution wheel 36 respectively. As dilution wheel 36 turns, the graded surfaces of cuffs 56, 68 interact with the concave surface of detents 64 to allow cuffs to slide in and out of detents 64. The spring in the first embodiment provides an added tension such that when cuffs enter detents 64, cuffs click into position. Similarly, the optional spring-loaded ball plunger 86 allows ball to spring into position within detents 64, providing a tactile click when in position.

Figure 18:
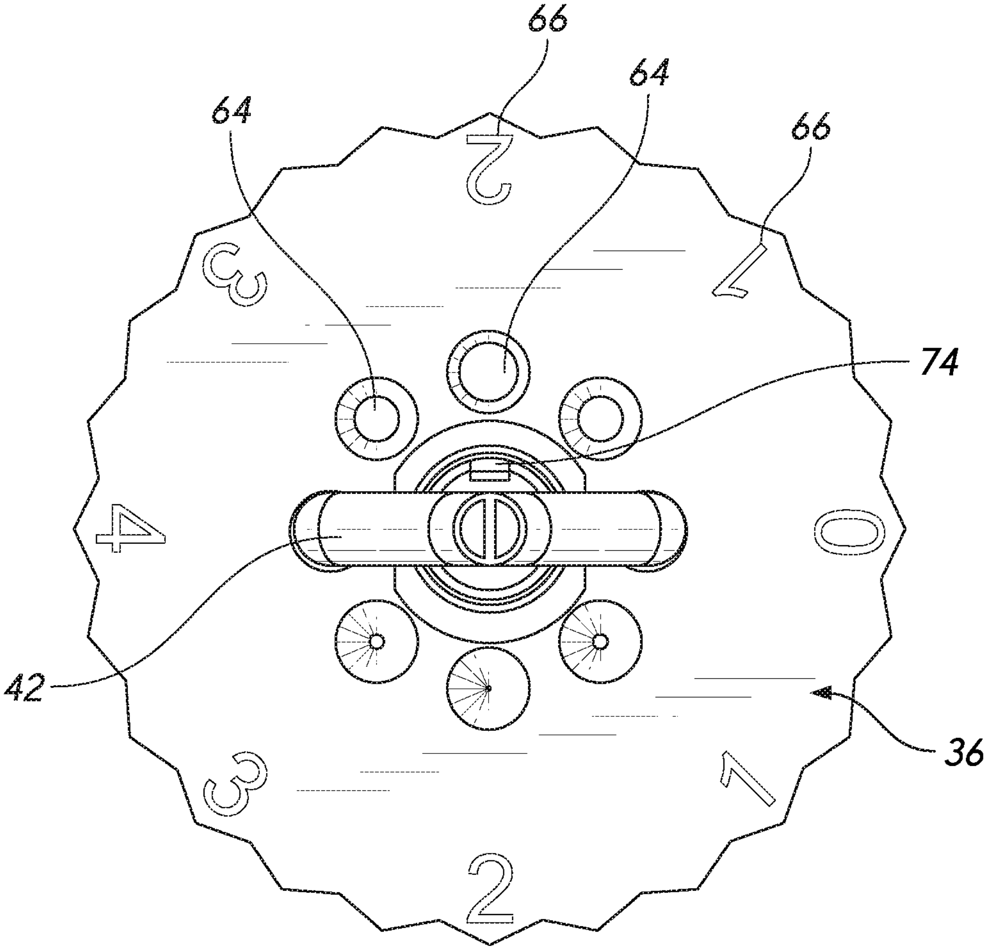
FIG. 18 is a top plan view, showing component parts of the spray bottle assembly.

The relative sizes of openings within detents 64 on dilution wheel 36 are shown in FIG. 18. Openings within detents 64 are generally circular in nature and vary by the size of their diameter. When in position, dip tube combiner 42 aligns over two detents 64 opposite one another on dilution wheel 36. The detent 64 openings shown and described allow for five (5) different solution combinations. Indicators 66 represent these combinations and are represented as numbers on dilution wheel 36. However, any type of indicator, character, or symbol can be used. In the illustrated example, the ratios of a first liquid, liquid A, to a second liquid, liquid B, include the following combinations: 1A:0B, 0A:1B, 1A:1B, 1A:3B, and 3A:1B. In other words, when the dilution wheel is set to one large opening and one blocked opening, the solution dispensed will be 100% of liquid A. Similarly, when the dilution wheel is set to block liquid A, the solution dispensed will be 100% of liquid B. When the dilution wheel is set to permit flow through two equal openings, the user will dispense a mixture made up of one part of liquid A to one part of liquid B, or a one to one ratio (1:1). Finally, when the dilution wheel is set to one small opening and one larger opening, the mixture is either one part of liquid A to three parts of liquid B (or a 1:3 ratio) or three parts of liquid A and one part of liquid B (or a 3:1 ratio).

The preceding description contains significant detail regarding the novel aspects of the present invention. It should not be construed, however, as limiting the scope of the invention but rather as providing illustrations of the preferred embodiments of the invention. As an example, although the present invention illustrates the detent openings having a certain size, the detents could include many different sized openings. Additionally, a greater number of detents could be utilized to create further ratios of liquid combinations. This could be achieved by providing detents with openings having varied diameters.

Having described my invention, I claim:

1. A spray bottle assembly for use with a trigger sprayer assembly to dispense a fluid, said spray bottle assembly comprising:
- a bottle configuration having at least one mouth and at least two containers, wherein at least two dip tubes extend into said at least two containers,
- a bottle adapter engaged with said at least one mouth of said bottle configuration,
  - wherein said bottle adapter has a flat portion on its upper side, a rod extending upward and at least two openings,
  - wherein said at least two openings accept said at least two dip tubes,
  - wherein said at least two openings are surrounded by at least two cuffs on said flat portion of said bottle adapter,
- a dilution wheel, having a central opening to accept said rod of said bottle adapter,
  - wherein said dilution wheel has a top side and a bottom side,
  - wherein said top side has a series of detents and said bottom side has a series of detents,
- a trigger sprayer adapter, having a central bore connected to said rod of said bottle adapter and at least two openings having at least two cuffs fluidly engaged with at least two of said series of detents on said top side of said dilution wheel,
  - wherein said, dilution wheel is rotatable with respect to said trigger sprayer adapter and said bottle adapter,
- a dip tube combiner engaged with said at least two openings on said trigger sprayer adapter on a first end, and said dip tube combiner engaged with a trigger sprayer assembly on a second end, wherein said trigger sprayer assembly dispenses said fluid.

2. The spray bottle assembly of claim 1, wherein said bottle adapter further comprises a main body, at least two posts and a captive nut, wherein said captive nut engages with said mouth on said at least two containers.

3. The spray bottle assembly of claim 1, wherein said series of detents on said top side and said bottom side of said dilution wheel have a concave inner surface and at least three of said series of detents have an opening and at least one of said series of detents is impenetrable.

4. The spray bottle assembly of claim 1, wherein said series of detents on said bottom side of said dilution wheel have a circumference; and wherein said dilution wheel further comprises a series of ball detents having a circumference greater than said circumference of said series of detents on said bottom side.

5. The spray bottle assembly of claim 4, wherein said upper side of said bottle adapter has at least one ball-plunger frictionally engaged with said series of ball detents on said dilution wheel.

6. The spray bottle assembly of claim 1, wherein said bottle configuration includes a first mouth on said first container and a second mouth on said second container.

7. The spray bottle assembly of claim 6, wherein said bottle adapter further comprises:
- a main body fixed to a first post having a central bore and a second post having a central bore;
- a first nut and a second nut engaged with, and freely rotatable about, said first post and said second post; and
- wherein said first nut is removably engaged with said first mouth of said first container and said second nut is removably engaged with said second mouth of said second container.

8. The spray bottle assembly of claim 1, further comprising a series of fluidly connected components:
- wherein said at least two dip tubes fluidly connect to said at least two openings on said bottle adapter,
- wherein said at least two openings on said bottle adapter fluidly connect to at least two of said detents on said bottom side of said dilution wheel,
- wherein said at least two of said detents on said top side of said dilution wheel fluidly connect to said at least two openings on said trigger sprayer adapter,
- wherein said at least two openings on said trigger sprayer adapter fluidly connect to said dip tube combiner,
- wherein said dip tube combiner fluidly connects to said trigger sprayer assembly, and
- wherein a watertight seal is formed between each of said series of fluidly connected components.

9. The spray bottle assembly of claim 1, wherein said central bore of said trigger sprayer adapter has a key and said rod of said bottle adapter has a keyway, wherein when said rod extends into said central bore, said keyway accepts said key, such that said trigger sprayer adapter and said bottle adapter are rotationally secure with one another.

10. A spray bottle assembly for use with a trigger sprayer assembly to dispense a sprayed fluid comprised of a first fluid and a second fluid, said spray bottle assembly comprising:
- a bottle configuration having a first container having a first mouth and a second container having a second mouth, wherein a first dip tube extends into said first container and a second dip tube extends into said second container, a bottle adapter engaged with said first and second mouth of said bottle configuration, wherein said bottle adapter has a main body, a rod extending upward from said main body and a first and second opening passing through said main body, wherein said first and second openings of said bottle adapter receive said first and second dip tubes, a dilution wheel, having a central opening to accept said rod of said bottle adapter, wherein said dilution wheel has a series of detents arranged radially around said central opening, a trigger sprayer adapter, having a central bore to accept said rod of said bottle adapter and a first opening and a second opening fluidly engaged with at least two of said series of detents said dilution wheel, wherein said dilution wheel is rotatable with respect to said trigger sprayer adapter and said bottle adaptor, a dip tube combiner fluidly engaged with said at least two openings on said trigger sprayer adapter on a first end, and wherein said dip tube combiner is fluidly engaged with said trigger sprayer assembly, having a spray nozzle and a trigger, on a second end.

11. The spray bottle assembly of claim 10, further comprising a series of fluidly connected components:

wherein said at least two dip tubes fluidly connect to said at least two openings on said bottle adapter, wherein said at least two openings on said bottle adapter fluidly connect to at least two of said detents on said dilution wheel, wherein said at least two of said series of detents on said dilution wheel fluidly connect to said at least two openings on said trigger sprayer adapter, wherein said at least two openings on said trigger sprayer adapter fluidly connect to said dip tube combiner, wherein said dip tube combiner fluidly connects to said trigger sprayer assembly, and wherein a watertight seal is formed between each of said series of fluidly connected components.

12. The spray bottle assembly of claim 11, wherein said dilution wheel has at least eight rotational positions providing at least five variations of said sprayed fluid, and wherein when said first container is filled with said first fluid and when said second containers is filled with said second fluid, said trigger on said trigger sprayer assembly creates a negative pressure when activated, thereby pulling said first and second fluid through said fluidly connected components and combine.

13. A spray bottle assembly for use with a trigger sprayer assembly to dispense a fluid, said spray bottle assembly comprising:

a bottle configuration having one mouth and at least two containers, wherein a first dip tube extends into said first container and a second dip tube extends into said second container, a bottle adapter engaged with said one mouth of said bottle configuration, wherein said bottle adapter has a main body housing a dip tube receiver, wherein said bottle adapter further comprises a rod extending upward and having a keyway, a spring encircling said rod, wherein said dip tube receiver rests on said spring and has a flat portion on its upper side having at least two openings surrounded by at least two cuffs, wherein said at least two openings on said dip tube receiver are fluidly connected to said first and second dip tubes, a dilution wheel, having a central opening to accept said rod, wherein said dilution wheel has a top side and a bottom side, wherein said top side has a series of detents and said bottom side has a series of detents, wherein said dilution wheel does not include a key, allowing said dilution wheel to rotate about said rod, a trigger sprayer adapter, having a base with at least two openings having at least two cuffs fluidly engaged with at least two of said series of detents on said top side of said dilution wheel, and a central bore having a key, wherein said keyway on said rod accepts said key on said central bore of said trigger sprayer adapter, such that said trigger sprayer adapter and said bottle adapter are rotationally stationary with respect to said dilution wheel, a dip tube combiner engaged with said at least two openings on said trigger sprayer adapter on a first end, and said dip tube combiner engaged with a trigger sprayer assembly on a second end, wherein said trigger sprayer assembly dispenses said fluid.

14. The spray bottle assembly of claim 13, wherein said trigger sprayer adapter further comprises an assembly nut securing said rod.

15. The spray bottle assembly of claim 13, wherein said spring provides an upward force that encourages said at least two cuffs on said dip tube receiver to engage with said series of detents on said bottom side of said dilution wheel, creating a watertight engagement.

16. The spray bottle assembly of claim 13, wherein said dip tube combiner is Y-shaped and includes a divider wall separating two chambers within said dip tube combiner.

17. The spray bottle assembly of claim 13, wherein said series of detents on said top side and said bottom side of said dilution wheel have a concave inner surface and include different sized openings.

18. The spray bottle assembly of claim 13, wherein said at least two cuffs on said dip tube receiver are rubber O-rings that provide an elastic force to engage with said series of detents on said bottom side of said dilution wheel, creating a watertight seal.

19. The spray bottle assembly of claim 13, further comprising a series of fluidly connected components:

wherein said first and second dip tubes fluidly connect to said at least two openings on said dip tube receiver, wherein said at least two openings on said dip tube receiver fluidly connect to at least two of said detents on said bottom side of said dilution wheel, wherein said at least two of said detents on said top side of said dilution wheel fluidly connect to said at least two openings on said trigger sprayer adapter, wherein said at least two openings on said trigger sprayer adapter fluidly connect to said dip tube combiner, wherein said dip tube combiner fluidly connects to said trigger sprayer assembly, and wherein a watertight seal is formed between each of said series of fluidly connected components.

20. The spray bottle assembly of claim 13, wherein said rod is secured by a press fit or snap fit connection.

* * * * *